US005563586A

United States Patent [19]

Baum et al.

[11] Patent Number: 5,563,586

[45] Date of Patent: Oct. 8, 1996

[54] APPARATUS FOR LIMITING CONTROL OF ELECTRICAL EQUIPMENT

[75] Inventors: Matthew C. Baum, Westwood, N.J.; Albert Nagler, Spring Valley, N.Y.; Edmund E. Sherman, Wayne, N.J.

[73] Assignee: Ambitech Industries, Inc., Hillsdale, N.J.

[21] Appl. No.: 282,712

[22] Filed: Jul. 29, 1994

[51] Int. Cl.[6] .......... H04Q 1/00

[52] U.S. Cl. .......... 340/825.07

[58] Field of Search .......... 340/825.31, 825.07

[56] References Cited

U.S. PATENT DOCUMENTS

| | | | |
|---|---|---|---|
| 3,953,769 | 4/1976 | Sopko | 340/825.31 |
| 4,485,381 | 11/1984 | Lewiner et al. | 340/825.31 |
| 4,749,991 | 6/1988 | Davis et al. . | |
| 4,787,008 | 11/1988 | Graff et al. . | |
| 4,905,559 | 3/1990 | Viviani . | |
| 5,006,843 | 4/1991 | Hauer . | |
| 5,021,776 | 6/1991 | Anderson et al. . | |
| 5,021,916 | 6/1991 | Hubbard | 340/825.31 |
| 5,164,718 | 11/1992 | Cedergren | 340/825.31 |
| 5,264,834 | 11/1993 | Silken et al. | 340/825.31 |
| 5,313,639 | 5/1994 | Chao | 340/825.31 |
| 5,434,368 | 7/1995 | Hoffmann | 200/43.22 |

*Primary Examiner*—Brian Zimmerman

[57] ABSTRACT

An apparatus or system for limiting access to control of electrically operated equipment. In order to access control of the equipment, i.e., to activate or deactivate the equipment, an operator must enter an access code for example by working a predetermined number of switches or code. An additional feature of the system includes a dwell time function to allow access to control the equipment for a limited time after deactivation.

24 Claims, 3 Drawing Sheets

Logic Diagram of Logic Module 100

Logic Diagram of Logic Module 100

APPARATUS FOR LIMITING CONTROL OF ELECTRICAL EQUIPMENT

BACKGROUND OF THE INVENTION

1. Field of Use of the Invention

This invention relates to a system or apparatus for controlling access and/or non-access to electrically operated or motor driven equipment, so as to prevent unauthorized turning on and operation of, or unauthorized turning off of equipment, depending on which mode is operative. If desired, both modes of protection could be used together. In particular, the present invention relates to a system or apparatus which prevents improper use of hazardous or dangerous equipment (such as saws, cutters, etc.) as well as apparatus to minimize the dangers which would occur should other types of machinery (e.g. ventilating fans or drainage pumps) be turned off at certain inopportune times.

Additional functions which make use of the nature of operation of the machine can ensure that entering the access code need not be done too often, thereby making the system more "user friendly."

2. Prior Art

Key switches have been used in the past as a means for preventing unauthorized operation of equipment. Difficulties have arisen where the key for such switches must be shared, since the key is often left in the switch—thereby eliminating the protective function. Also, keys have been used on vehicles, but these are also subject to loss, mishandling, etc. Reprogramming with key switches is not easily accomplished.

Various electronic devices have been used as "electronic combination locks" to control access to physical spaces. These devices, however, do not relate to controlling operation or non-operation of equipment.

A particular and preferred field of use of the present invention is in the control of saws and other power machinery.

SUMMARY OF THE PRESENT INVENTION

The present invention relates to a system or apparatus wherein an operator must enter an access code for example by working a pre-determined set of switches or codes before access is granted to either turn on or turn off an electrically operated machine or device.

Various switch and code combinations can be used, ranging from the simple (with few codes) to the complex, where the possibility of many codes eliminates the likelihood of improper use for all practical purposes. In addition, changing the code at any time (for instance, should the code become compromised) is simple, unlike the situation where a physical key is used.

A number of different switch devices, such as, for example, "keypad" switch devices, are presently available for the control of alarm systems and the like. These can be used as the code input means of a system according to the present invention. In the most simple (and therefore the most practical) embodiment, the existing means for activation and deactivation of the system (such as the START and STOP control buttons of the machine itself) can be used to provide the access control code as well, and operation of the machine is allowed only after the correct sequence of actions has been accomplished with the control buttons in the "security mode."

Often a machine must be turned on and off multiple times (such as when setting up, or when changing an adjustment) in the course of its operation. In such cases, it would be unwieldy to require the operator to enter the access code each time. Therefore, an additional feature of the present invention includes a dwell time means for detecting when the machine is operating. The dwell time means allows access to control the machine for a limited time after it has been shut off (when the system has been wired for "start access" only.)

In the case of a machine which requires braking to stop, and where the braking requires some time, this "re-trigger" (dwell time means) feature can be set to start at the conclusion of braking, rather than at motor turnoff.

In other cases, where a machine may be operated at different speeds, or in different directions, access to either all, or only some of the various combinations, may be limited by the present apparatus.

DETAILED DESCRIPTION OF THE INVENTION

The present invention is described by reference to specific embodiments thereof, hereinbelow. The description is meant to be illustrative and not limiting on the scope of this invention.

Description of the Drawings:

Description of Block Diagrams:

Non-Dedicated Controls for Start Access: (FIG. 2)

Figure 2:
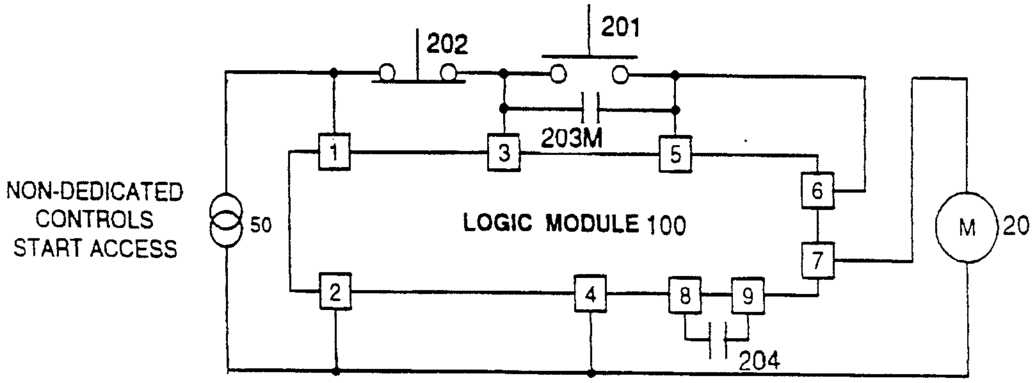
FIG. 2 is a diagram of the present non-dedicated controls for start access.

FIG. 2 shows a system having a conventional Start-stop control system connected to a Load 20, via Logic Module output relay connections, 6–7. Operation of the system would normally require a closure of Switch, 201, connected across Terminals 3 and 5. A holding contact, 203M, supplied from Load 20 enables this to be a momentary contact. In some embodiments, Switch 201 might consist of several switches wired in parallel, to allow for several points of control.

In the present case, the Logic Module 100 (by virtue of its connections to both Start 201 and Stop 202 switches) is able to determine the states of these switches. Only after a correct sequence or code has been entered are the contacts at 6 and 7 closed, permitting the Load 20 to be activated with the next closure of the Switch 201. The instance when unauthorized turning off of a machine is desired is described below under "Dedicated Controls STOP Access, FIG. 4."

Dedicated Controls Start Access: (FIG. 3)

Figure 3:
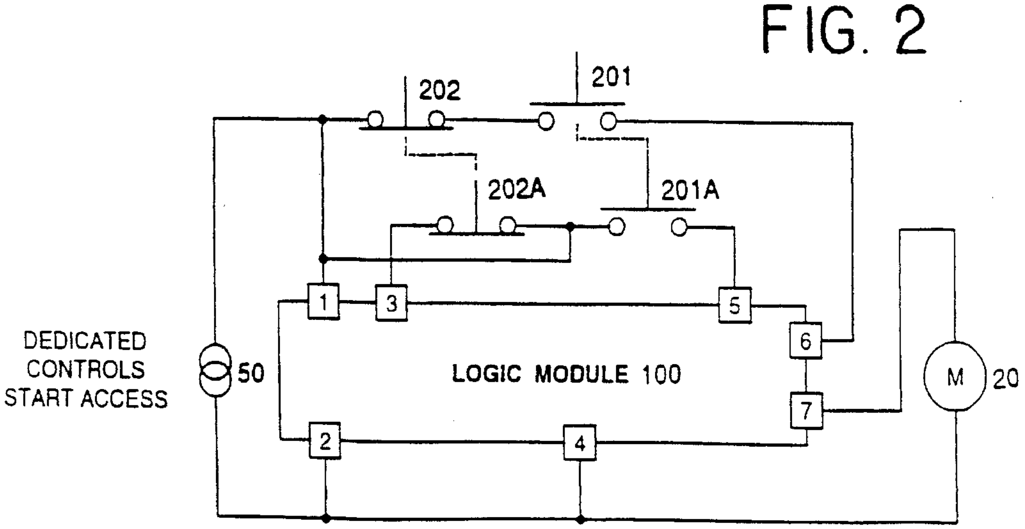
FIG. 3 is a diagram of the instant dedicated controls start access.

FIG. 3 shows a system similar to that of FIG. 2 with the difference that each of the switches is supplied with an extra set of contacts. In this way the contacts used for the-access control are kept separate from those used for the actual load control. The Logic Module, 100, is still able to decode the switch operations—but now greater flexibility is allowed, since the switches which work the logic are electrically distinct from those which control the load.

Various combinations of the Dedicated Controls can be used to permit access under only certain combinations of operation from multiple station control. These would include High Speed, Low Speed, Forward, Reverse, etc. By appropriate combinations of contacts, any logical or sequential combination can be either included or excluded.

Figure 4:
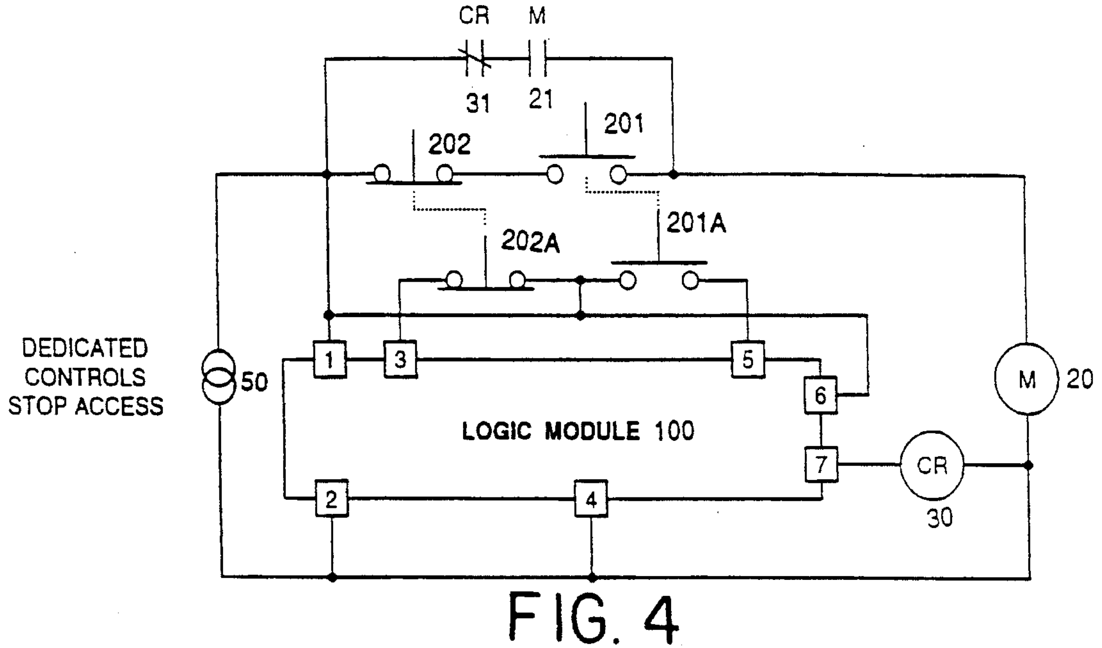
FIG. 4 is a diagram of the instant dedicated controls stop access.

Dedicated Controls STOP Access (FIG. 4.)

The Logic Module operation is the same as that of FIG. 3. However, the output is used not to operate the load, but to operate a Control Relay 30. Control Relay Contact 31 acts as a bypass path in parallel with Switch 202, so that the load cannot be de-energized without the operation of CR. Only after the code is input and accepted by the logic module is operation of Switch 202 effective in causing Load 20 to be de-energized.

Non-Dedicated Controls—Start and Maintained access. (FIG. 5)

Figure 5:
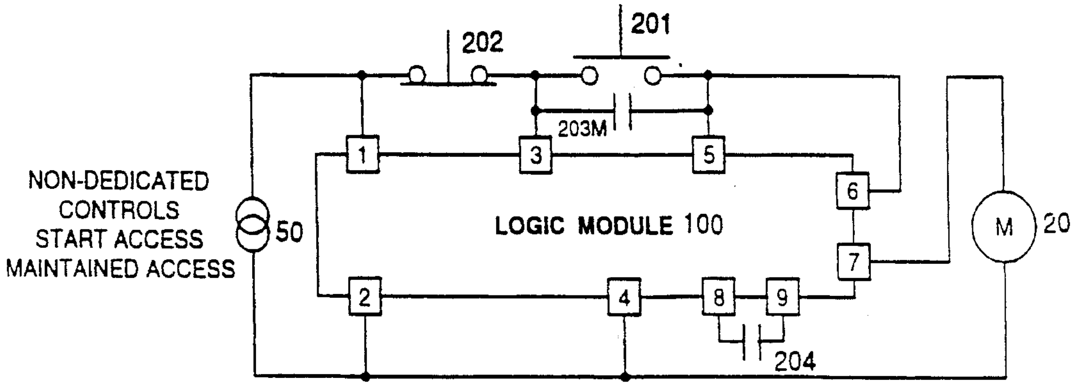
FIG. 5 is a diagram of the instant non-dedicated controls start access maintained.

FIG. 5 shows a system similar to that of FIG. 2, wherein a code must be activated by the sequenced operation of Switches 201,202 before internal contacts close across Terminals 6 and 7 to allow Load 20 to be energized.

In FIG. 5, however, an additional input has been provided via Process Control Input Terminals 8 and 9. Closure of a switch or other contact across Terminals 8 and 9 allows the access interval to be extended indefinitely, so long as the connection is maintained closed. In this way other process functions can continue to "keep alive" the access grant, even if power to the Load 20 is turned off by other means.

Figure 1:
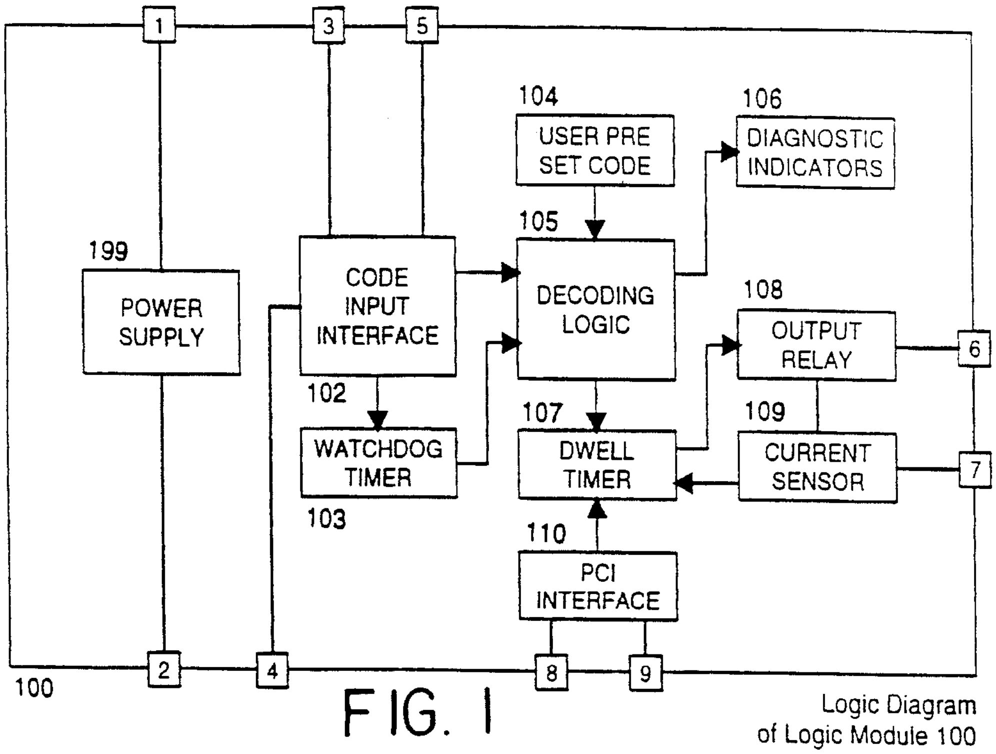
FIG. 1 is a logic diagram of the instant logic module.

Logic Module Block Diagram: (FIG. 1)

The function of the Logic Module is to decode the input switches, to operate the output on receipt of the correct code input, and to provide other control functions as described below.

The Power Supply 199 is used to transform the available power presented at Terminals 1 and 2 to the power required by the particular logic used to implement the logic functions. This will generally be low voltage DC.

The Code Input Interface 102 examines the inputs from Terminals 3, 4 and 5, which are connected to the control switches, and determines their states.

The Watchdog Timer 103 is activated each time an input switch is released. It is used to reset the Decoding Logic 105, and to render the current code input invalid if too long an interval is found between input button operations.

The Decoding Logic 105 compares the input code with the pre-set code 104 to determine validity. Diagnostic Indicators 106 may be provided to show when a code switch is activated, when the correct code has been entered, when a wrong code has been entered, or when the output has been enabled.

If the correct code has been entered within the allowed time, the Dwell Timer 107 is activated, which in turn operates the Output Relay 108. The Dwell Timer 107 allows only a limited interval after the granting of access during which the output relay will operate. (This will normally be from several seconds to several minutes.) At the expiration of the Dwell Timer time, the Output Relay will be disabled and the load de-activated, requiring entry of the Access Code again for re-activation.

Two mechanisms may be used to extend the time limit of the Dwell Timer. First is the Current Sensor 109 connected in series with the Output Relay between Terminals 6 and 7. If current is actually flowing to the load (through the Current Sensor, 109) the Dwell Timer is re-triggered and not allowed to expire so long as the load is active and this current flows. The load will normally be shut off by independent operation of the (normally closed) STOP Switch, 202.

In addition a Process Control Interface, (PCI) 110 can be used to keep the Dwell Timer active. This can ensure that the granted "access" not expire even though the load has been turned off in the normal way. One other use for the PCI interface would be where electronic or other "leaky" controls are used for the main-control switches 201, 202. Leakage in these switches could be misinterpreted by the Current Sensor 109 as load current. To eliminate this possibility, the Current Sensor can be disabled, and the PCI interface activated by a contact on the load itself. Another application would be where coasting or braking time of a machine which has been turned off must be added to the allowed "re-trigger" Dwell Time. Here a sensor or switch can be used to delay activation of the Dwell Timer until the machine has come to a full stop.

Figure 6:
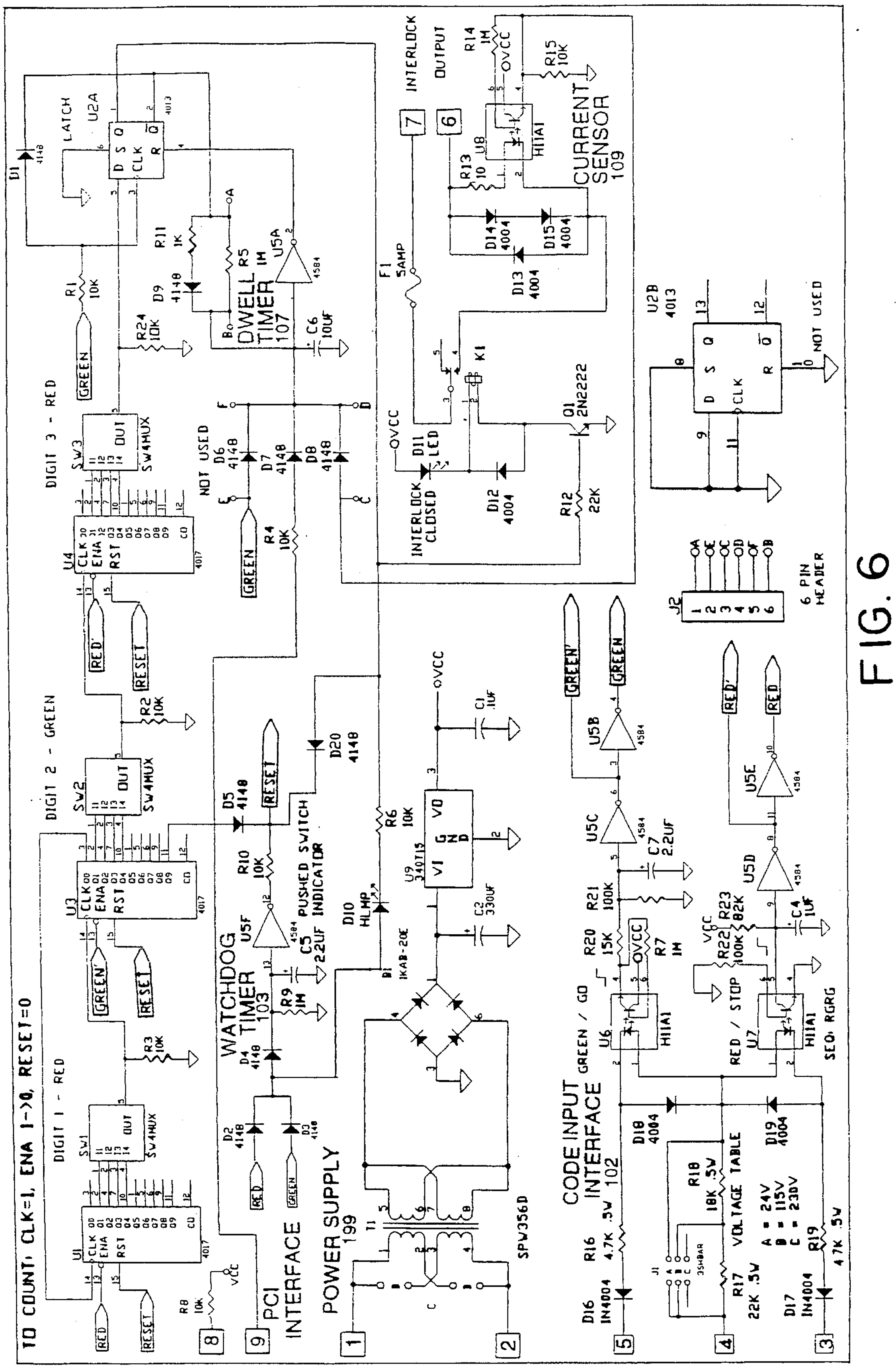
FIG. 6 is a detailed implementation of the instant logic module.

General Description of Logic Module 100(FIG. 1 and 6)

In the hereinbelow discussion there is provided a general description of the operation of the present system, as well as a detailed description of the present access or non-access limiter illustrative circuit. The Access Limiter (FIG. 1) includes an Interlock Switch 108 which closes when an operator correctly enters a security code, for example a three digit code, that matches the pre-programmed code. The present system includes the capability for each digit to be set in the range of 1 through 9, which yields 729 different combinations.

The security code can be input via a pair of momentary switches, in a prescribed sequence and time period. The present system has the flexibility to use switches which are dedicated to code input exclusively or with switches that provide code input while simultaneously acting as the primary control elements in another circuit (non-dedicated mode.) At the time of installation, the user can determine which of the two methods is to be used.

For the sake of example, the switches 202 and 201 will be referred to as "Red" and "Green" and represent the numeric quantity for each digit of the three digit key as i (Red) for digit one, j (Green) for digit two and k (Red) for digit three. A digit is input by toggling an input switch as necessary to "count up" the digit. (This is analogous to expressing a number n by tapping on a pipe n times.) After the third digit is entered, the Green switch is toggled once more to indicate that the code input sequence is now complete. The unit then evaluates the entire code for correctness.

Thus to input the code would require the Red switch to be toggled i times, the Green j times, the Red k times and finally the Green once. (The final "Green" is the turn-on command.)

The code must be input in exactly this way. To prevent tampering, means are provided such that the system does not allow a random input of digits and then the correct code, as this might allow someone to "stumble" onto the correct code by trial and error.

A Watchdog Timer is employed to monitor the code input sequence. Once the input sequence has started, if more than three seconds elapse between switch toggles, the system is reset.

In a motor control application, the interlock Switch 108 is connected as a series element in a motor starter control loop (FIGS. 2–5, Terminals 6 and 7.) Those who do not possess the access code will not be able to activate the Motor Starter 20.

Once the correct code has been entered and accepted by the system, the Interlock Switch 108 closes and will remain closed as long as either:

1) a current passes through the interlock switch (which has an integral Current Sensor, 109) or 2) a normally open Auxiliary Contact 204 on the motor starter remains closed across the PCI Interface (FIG. 1, 110, Terminals 8 and 9.)

When current flow into the motor starter is interrupted by activating the Stop Switch 202 (or by other means,) the interlock switch will remain closed for an additional period of "dwell" time during which the current may be reapplied without the need to reenter the access code. If the current is not reapplied prior to the expiration of the dwell time, the system will reset, opening the interlock switch 108 until the correct code is once again entered.

Schematic Diagram Description—FIG. 6

The system's internal Power Supply 199 consists of a step down transformer T1, a full wave bridge rectifier B1, a filter capacitor C2, a voltage regulator U9 and decoupling capacitor C1.

Transformer T1 has two primaries which are placed either in parallel or series to accommodate AC line input voltages of 115 or 230 volts respectively. The secondary windings are placed in parallel, producing 17 volts AC RMS. The secondary voltage is full-wave rectified by B1, producing approximately 24 volts of DC which is filtered by capacitor C2 and input to regulator U9. The regulated 15 volts DC output from U9 is decoupled by Cl and distributed to the rest of the system as VCC.

The isolated 2 channel Code Input Interface 102 consists of optocouplers U6 and UT, an input voltage matching resistor array R16, R19, R17 and R18, filters R20, R21, C7, R23 and C4 and Schmitt trigger followers U5B, U5C, U5D and U5E which produce squared-up signals in both true and complementary form when the sensing inputs are activated.

The system provides the flexibility to accommodate three common AC Control Voltages 50. These are 24 V, 115 V and 230 V, which are selected by placing jumper J1 in the appropriate designated position.

The interface common return line Terminal 4 is connected to one side of the AC power source 50. The Stop Sense Input Terminal 3 and Start Sense Input Terminal 5 connect to the remaining side of the AC power source through a momentary Switches 202 and 201.

The Watchdog Timer 103 is implemented with R9, C5 and U5F. It is activated whenever a code input switch changes state, and begins timing when the switch returns to its original (normal) state.

When the Watchdog Timer expires, the system's internal decoding mechanism, as well as any previously entered code digits, are cleared. This will occur if the correct code is not input once the code input switches are returned to their normal state, or if the code input sequence is terminated prematurely.

Once the correct Access code is input, the decoding mechanism 105 (FIG. 1) is cleared and the Watchdog Timer is subsequently ignored for the remainder of that cycle.

The watchdog timer serves two purposes. First, it provides an automatic "clear" function when an operator mistakenly inputs the wrong code. Second, it deters tampering by continuously clearing the system of incorrect input codes.

Concealed shunt type jumpers SW1, SW2 and SW3 are provided for setting each of the three code digits. Each digit may be set in the range of 1 to 9 (of which the first 4 are shown in FIG. 6.) The security code may be reprogrammed simply by removing power from the system and rearranging the jumpers.

The Decoding Logic 105 (of FIG. 1) consists of three Decade Counters U1, U3 and U4, an Output Latch U2A, and Code Selection Jumpers (SW1, SW2 and SW3).

The counters accumulate and evaluate the security code input by the operator. Each correctly entered digit enables the following digit in the sequence to be evaluated. After all three code digits have been correctly entered, toggling Switch 201 activates the Output Latch, U2A. The "set" output of the latch clears the decoding mechanism, activates the Dwell Timer 107 and the Output Relay 108, which connects the Power Source 50 to the Load 20 provided Switch 202 and 201 are closed.

The function of the Dwell Timer 107 is to provide a time window during which the starter may be reactivated after the motor Stop contact 202 is activated without having to re-enter the access code. The time window can be set for 10 seconds nominal, but may operate in the range of 0.1 to 45 seconds by changing the values of R5 and C6. This convenience feature may be disabled by changing the R5-C6 time constant to 0.1 seconds.

The Dwell Timer 107 consists of timing elements R5 and C6, as well as a Schmitt trigger follower U5A, which squares up the slowly changing voltage on C6. The output of U5A resets the output latch U2A which in turn opens the Output Relay K1.

Diodes D7 and D8 logically "OR" signals from the Current Sensor 109 and the PCI Interface 110. The presence of a signal on either of these inputs extends the dwell time indefinitely.

The typical 10 second dwell time interval begins when the output latch U2A is set and there is no signal present on the anode of either D7 (PCI Interface) or D8 (Current Sensor.) This will occur when the Motor Starter 20 status changes from asserted to not asserted. If desired during the dwell time period, the motor starter may be again asserted, which will extend the dwell time indefinitely.

R8, R4, D7 and User Terminals 8 and 9 constitute the Process Control Interface 110.

The PCI interface provides an alternate means to suspend the dwell timer and keep the output relay closed indefinitely. The correct code must first be input to enable this function, which is then activated by closing an external contact across the PCI Terminals 8 and 9, causing D7 to conduct. Normally the Current Sensor 109 is used exclusively for this purpose. The PCI interface may be used either in conjunction with the current sensor or as a substitute for it.

When the external PCI contact is opened, C6 is released and the dwell time delay begins. At the expiration of the dwell time delay, the system will reset and the output relay will open. However, if the PCI contact is closed before the dwell time expires, the output relay will remain closed.

If a Motor Brake is used, the brake deceleration period might be longer than the dwell time interval, which runs concurrent with the brake cycle. Unless the brake time is very short, the operator would not be able to restart the motor immediately after the brake cycle ended without first having to re-enter the code.

Providing a contact on the brake device and connecting it to the Process Control Interface 110 will keep the "Access Limiter" output switch latched and the dwell timer disabled until the end of the brake cycle. An operator controlled switch can provide a similar function.

Two concealed LED's D10 and D11 are provided as Diagnostic Indicators 106 for diagnostic purposes.

LED D10 lights when a momentary code input switch is asserted via Diode D2 or D3.

LED D11 lights when the system Output Switch 108 is closed.

The Current Sensor 109 is connected in series with contacts of the Output Relay K1. (These two elements form the Output Interlock associated with Terminals 6 and 7.) When a current passes through the Output Interlock, it excites Optoccupler U8 via diode array D13, D14 and D15.

The function of the Current Sensor 109 is to keep the output relay closed as long as current is flowing through the output interlock.

Circuit Operation—Initial Conditions, FIG. 6

Hereinbelow is provided a description of the circuit operation.

At power on, Decade Counters U1, U3, U4 and D type Flip-Flop U2A must be properly initialized.

When the Power Source 50 is applied to Terminals 1 and 2, Switch 202 is assumed to be closed and Switch 201 open.

The Power Source 50 connected through Switch 202 to Terminal 3, exites Optoccupler U7. The collector of U7 will connect node R23-C4 to ground. Node R23-C4 is followed by Schmitt Trigger Inverter U5D which forms the complementary signal node RED'. RED' is inverted again by U5E producing a true output—node Red. The normal state of Switch 202 is closed yielding logic 0 (low) for Red.

The Power Source 50 is connected through Switch 201 to Terminal 5. The normal state of switch 201 at power up is open. Optoccupier U6 is not excited at this time. The open emitter of U6 is connected to voltage divider R20 and R21. Node R21-C7 is at ground potential which is inverted by U5C to form node GREEN', and inverted once more by U5B to form node GREEN. At this point, node GREEN is low.

GREEN and RED are ORed through Diodes D2 and D3. D4 anode and D10 anode are low. The input of Inverter U5F is defined to ground by R9 and its output, node RESET, is high. Node RESET is distributed to the reset inputs of U1, U3 and U4, initializing them to state Q(0)=1.

If U2A randomly comes up set, its complementary output Q' will be high and will charge C6 through R11 in time C6*R11. Time constant C6,R11 is sufficiently long that C6 will appear as a low to U5A, who's high output will then reset U2A. This process occurs on the order of 20 microseconds, far too short a time to activate the output relay K1. The initial condition of the state machine is now defined.

Code Evaluation—FIG. 6

The code evaluation mechanism, which compares the user input code to the preset master code, consists of three fully decoded decade counters (U1, U2 and U3) arranged in cascade such that if the correct code is developed in one stage it enables code evaluation in the successive stage. This process continues until all three code digits have been correctly entered. Code digit 1 is processed by U1, digit two by U3 and digit three by U4. A correctly entered code is latched in Output Latch U2A.

Typical Cycle of Operation, FIG. 6

We start with the Access Code set to 3-1-2: U1(Q3) via SW1 to U3(CLK); U3(Q1) via SW2 to U4(CLK) and U4(Q2) via SW3 to U2(5).

Power 50 is applied to Terminals 1 and 2.

U1, U3, U4 are reset: U1, Q(0)=U3, Q(0)=U4, Q(O)=1. U2A is reset.

Switch 202 is used to input digit 1, Switch 201 is used to input digit 2, Switch 202 for digit 3 and Switch 201 to evaluate the code.

When Switch 202 is first closed, on positive half cycles of AC (with respect to Terminal 4,) Optocoupler U7 and Diode D17 are forward biased and a current which is limited by R19 and (depending upon the position of J1) R17 and R18 flows through UT's input LED and Terminal 3.

(Similarly, when switch 201 is closed, Optocoupler U6 and Diode D16 are forward biased and a current which is limited by R16 and (depending upon the position of J1) R17 and R18 flows through U6's input LED and Terminal 5.)

When Switch 202 is closed, D2 anode and D4 anode are driven high, deactivating the Watchdog Timer by charging C5 immediately, driving U5F output low. U1, U3 and U4 are taken out of the reset mode, and U1 is enabled with RST=0 and CLK=1. U3 and U4 are disabled as their clock pins are tied to ground with Resistors R3 and R2. U1, pin 13 (enable) is also driven high on the transition of RED from 0 to 1. When Switch 202 is then released: (RED 1→0) driving U1, pin 13 low. On this falling edge, U1 is incremented (Q(n)→Q(n+1)): Q(O) is low, Q(1) is high. If switch 202 is toggled twice more before C5 can discharge through R9 (Watchdog Timer), it results in U1 Outputs Q(O), Q(1) and Q(2) being low and Q(3) high. U3 is now enabled from U1, Q(3).

Within the Watchdog Interval, Switch 201 is again depressed. D3 anode and D4 anode are driven high, renewing the charge on Watchdog timer timing Capacitor C5. U3, pin 13 (enable) is driven low by (GREEN'1→0). U3 is incremented (Q(n)→Q(n+1)): Q(O) is low, Q(1) is high. U4 is now enabled by U3, Q(1). U1 is now disabled as it's clock pin is low via U3, Q(O). Switch 201 is now released.

Within the watchdog interval, Switch 202 is depressed driving pin U4, 13 low (RED'1→0).U4 is incremented (Q(n))→Q(n+1): Q(O) is low, Q(1) is high. Switch 202 is released. Switch 202 is quickly toggled once again, resulting in both Q(O) and Q(1) being low and Q(2) high—setting the data pin of the output latch U2A.

Within the watchdog interval, switch 201 is depressed. The clock line of U2A is asserted (with DATA=1) and U2A is set. Diode D1 is forward biased, isolating the clock line through R1.

If at any time during the code input process the watchdog timer expires, U1 U3 and U4 are reset and the code input process must be re-started from the beginning.

When U2A is set, its high Q output drives the base of Transistor Q1 through current limiting Resistor R12. Q1 collector is now a low impedance to ground and a current flows through LED D11 and the coil of Relay K1. The contacts of K1 close and the interlock loop (Terminals 6 and 7) is complete.

U2A, output Q asserts Diode D20 (which is isolated from the Watchdog Timer via R10) resetting the Decoding Logic U1, U3 and U4.

Current from the Power Source 50 passes through Diode D13, and inverse-parallel Diodes D14 and D15 into the load. On alternate half-cycles of AC when D14 and D15 are forward biased, a voltage drop of approximately 1.2 volts is produced across the series pair. This voltage is sufficient to forward bias the input LED of Optocoupler U8. A current of 1.2 volts minus the voltage drop of U8's LED divided by R13 flows through the Optocoupler. The isolated transistor portion of U8, which is configured as a pass transistor, keeps the Dwell Timer Capacitor C6 charged via Diode D8.

If the PCI Interface 110 is substituted for the current sensor, closing a dedicated contact across PCI Terminals 8 and 9 keeps the Dwell Timer Capacitor C6 charged via D7. Resistors R8 and R4 provide isolation from capacitively coupled voltages developed in the wires connecting Terminals 8 and 9 to the remote contact.

At some later time, the Motor Starter Contactor 20 will be deactivated, and the PCI Contact 204 (if used) will be opened as well, interrupting flow sensed by the Current Sensor. Dwell timer Capacitor C6 will discharge through R5 into the low Q' output (sink) of U2*a*. When the voltage on C6 falls below ½ Vcc, U5A will switch from low to high, resetting the Output Latch U2A. U2A Q will go low, removing the base drive for Transistor Q1. With Q1's collector at high impedance, the output relay will open and Indicator LED D11 will be extinguished.

It should be understood, however that the foregoing description of the invention is intended merely to be illustrative thereof and that other embodiments, modifications and equivalents thereof may be apparent to those skilled in the art without departing from its spirit.

Having thus described the invention what we desire to claim and secure by Letters Patent is:

1. A system for controlling access to activate or deactivate an electrical apparatus wherein unauthorized activation or deactivation of the apparatus is prevented, the system comprising an authorization code input means for entry of an authorization code for generating a signal indicative thereof, a processing means connected to the input means for receiving the signal and for generating an output signal to activate or deactivate a first switching means if the entered signal indicates that a correct authorization code has been entered, the electrical apparatus having a second switching means and the electrical apparatus is turned on or turned off with the second switching means after the activation or deactivation of the first switching means.

2. The system according to claim 1, wherein the authorization code input means is a keypad entry apparatus or a multiple crosspoint switch.

3. The system according to claim 1, wherein the processing means is a microprocessor.

4. The system according to claim 1, wherein the processing means further comprises a tampering prevention means which cancels all entries on receipt of an incorrect authorization code entry input prior to entry of a correct authorization code.

5. The system according to claim 1, wherein the authorization code is inputted via switch closure means.

6. The system according to claim 1, wherein an open circuit in a control loop of the system provides access to control the electrically operated apparatus.

7. The system according to claim 6, wherein the processing means controls the activation or deactivation of the first switching means which is an interlock switch means.

8. The system according to claim 1, further comprising a timer means for timing an interval between individual authorization code input entries and for invalidation of an input authorization code if a time interval exceeds a preset time interval.

9. The system according to claim 1, wherein on and off activation means of the electrically operated apparatus are used as the authorization code input means.

10. The system according to claim 1, wherein on and off activation means as well as additional dedicated switch means of the electrically operated apparatus are used as the code input means.

11. The system according to claim 9, wherein the authorization code comprises alternate groups of toggles of the on and off activation means.

12. The system according to claim 1, wherein the processing of the signal generated by the authorization code is processed by counting logic, a state machine, microprocessor, or by analog means.

13. The system according to claim 1, further comprising a dwell timer means for providing a time window during which the electrically operated machine may be reactivated after deactivation without the need to reenter the authorization code.

14. The system according to claim 13, wherein time extension of the dwell timer means is obtained by current detection means, switch detection means or external detection means.

15. The system according to claim 13, wherein the dwell timer means is settable for a particular preset time period and the time window begins at apparatus deactivation.

16. The system according to claim 15, wherein the dwell timer senses electrical apparatus operation or deactivation by detection of a current in a control loop.

17. The system according to claim 15, wherein the dwell timer senses electrical apparatus operation or deactivation by means of a current transformer.

18. The system according to claim 15, wherein the dwell timer senses electrical apparatus operation or deactivation by means of current in an optocoupler.

19. The system according to claim 15, wherein the dwell timer senses electrical apparatus operation or deactivation by means of the status of an external switch or contact.

20. The system according to claim 1, wherein access to the electrical apparatus is permanent upon acceptance of the authorization code and the electrical apparatus must be deactivated by reentry of the authorization code.

21. The system according to claim 1, wherein the system allows activation of an electrical apparatus.

22. The system according to claim 1, wherein the system allows deactivation of an electrical apparatus.

23. The system according to claim 1, wherein entry of the authorization code is required in order to cause the electrical apparatus to be operated in the forward or reverse directions or to change the speed of operation of the electrical apparatus.

24. The system according to claim 1, wherein entry of the authorization code is required to control various functional operations of the electrical apparatus.

* * * * *